(12) United States Patent  (10) Patent No.: US 6,676,091 B2
Hauer  (45) Date of Patent: Jan. 13, 2004

(54) RETAINING MEMBER AND RETAINING SYSTEM FOR RIGID DUCTS IN A VEHICLE

(75) Inventor: Matthias Hauer, Hillerse (DE)

(73) Assignee: Volkswagen AG (DE)

( * ) Notice: Subject to any disclaimer, the term of this patent is extended or adjusted under 35 U.S.C. 154(b) by 295 days.

(21) Appl. No.: 09/797,285

(22) Filed: Mar. 1, 2001

(65) Prior Publication Data

US 2001/0008265 A1 Jul. 19, 2001

Related U.S. Application Data

(63) Continuation of application No. PCT/EP99/05319, filed on Jul. 26, 1999.

(30) Foreign Application Priority Data

Sep. 3, 1998 (DE) .......................................... 198 40 136

(51) Int. Cl.[7] .................................................. F16L 3/12
(52) U.S. Cl. .................................................... 248/74.3
(58) Field of Search ............................. 248/74.3, 74.1, 248/74.2, 73, 56, 231.81; 24/543, 555, 562

(56) References Cited

U.S. PATENT DOCUMENTS

| 2,923,760 | A | * | 2/1960 | Famely ................. 174/40 CC |
|---|---|---|---|---|
| 3,606,218 | A | * | 9/1971 | Enlund et al. ............. 248/74.2 |
| 3,684,223 | A | * | 8/1972 | Logsdon .................. 248/74.3 |
| 4,172,578 | A | * | 10/1979 | Pate ........................ 248/74.3 |
| 4,260,123 | A | * | 4/1981 | Ismert .................... 174/166 R |
| 4,431,152 | A | | 2/1984 | Reed, Jr. ................... 248/65 |
| 4,442,994 | A | * | 4/1984 | Logsdon ................... 248/547 |
| 4,526,333 | A | * | 7/1985 | Nakama et al. .............. 248/73 |
| 4,678,147 | A | | 7/1987 | Barnes et al. ............. 248/74.1 |
| 5,031,460 | A | * | 7/1991 | Kanenobu et al. ............ 73/730 |
| 5,067,677 | A | * | 11/1991 | Miceli ..................... 248/74.1 |
| 5,460,342 | A | | 10/1995 | Dore et al. ................. 248/4.2 |
| 5,492,671 | A | * | 2/1996 | Krafft ........................ 422/26 |
| 5,586,739 | A | * | 12/1996 | Gantner et al. ............ 248/74.1 |
| 5,647,563 | A | * | 7/1997 | Gantner et al. ............ 248/74.1 |
| 5,655,673 | A | * | 8/1997 | Wterrings et al. ............ 211/75 |
| 5,772,160 | A | * | 6/1998 | Gordon ..................... 248/68.1 |
| 5,830,183 | A | * | 11/1998 | Krieger .................. 604/96.01 |
| 5,937,604 | A | * | 8/1999 | Bowron ..................... 52/426 |
| 6,152,412 | A | * | 11/2000 | Basickes et al. ........... 248/317 |
| 6,164,604 | A | * | 12/2000 | Cirino et al. .............. 248/74.3 |
| 6,173,926 | B1 | * | 1/2001 | Elvegaard ................. 248/74.1 |
| 6,244,447 | B1 | * | 6/2001 | Frieze et al. ............. 211/85.13 |

FOREIGN PATENT DOCUMENTS

| DE | 3025601 | 1/1982 |
|---|---|---|
| DE | 3705626 | 9/1988 |
| DE | 3824197 | 1/1990 |
| DE | 4123754 | 1/1993 |
| DE | 94032912 | 6/1994 |
| DE | 19546086 | 9/1996 |
| EP | 0010559 | 12/1982 |
| EP | 0408869 | 5/1990 |
| FR | 2572488 | 2/1986 |
| FR | 2704027 | 10/1995 |

* cited by examiner

*Primary Examiner*—Leslie A. Braun
*Assistant Examiner*—A. Joseph Wujciak, III
(74) *Attorney, Agent, or Firm*—Baker Botts LLP

(57) ABSTRACT

A bracket for holding a rigid duct, such as an air conditioner coolant duct in a motor vehicle, including a mounting part and a duct retaining part. The duct retaining part has a duct receptacle for a least partially surrounding the duct and including spaced, inwardly extending clamping projections for providing compressive elastic contact with the duct.

16 Claims, 2 Drawing Sheets

RETAINING MEMBER AND RETAINING SYSTEM FOR RIGID DUCTS IN A VEHICLE

RELATED APPLICATION

This application is a continuation of copending International application PCT/EP99/05319 filed Jul. 26, 1999, which is incorporated by reference herein, claiming priority from German patent application No. 198 40 136.1 filed Sep. 3, 1998. The International application was published in German on Mar. 16, 2000, by the International Bureau.

BACKGROUND OF THE INVENTION

The invention relates to a bracket and a system for retaining rigid ducts in a vehicle, applicable to the ducts of an air-conditioning system.

Rigid ducts are typically secured to a vehicle body part or vehicle component using open plastic clips and clamps. The relevant clamp may be provided with a rubber insert that has a compensating effect with respect to relative motion, such as between the clamp, which is fastened to the vehicle body part, and the duct, which is fastened to a vehicle component, thereby absorbing a dynamic load imposed by the running engine. Such clamps are also used to retain the refrigerant ducts of an air conditioning system installed in a vehicle. In the refrigerant circuit of the air conditioning system, a pressurized refrigerant duct is arranged between a condenser and an expansion valve, and a refrigerant suction duct is arranged between the expansion valve and a compressor upstream of the condenser. The compressor is attached to the engine, with the result that engine motions can be transmitted through the compressor via the suction duct and bracket to a vehicle component that is not adversely affected by the engine motion. In addition to the aforementioned motion-damping function, the duct brackets also serve a noise-damping function, since the compressor and the refrigerant flowing in the ducts generate objectionable noises that can be transmitted by the relevant duct to the bracket and thus to the vehicle.

In addition, plastic double clamps are known that can be used to secure parallel ducts.

The object of the invention is to provide improved brackets and systems for supporting rigid ducts in a vehicle that ensure the greatest possible decoupling of the vehicle from the dynamic and acoustic loads of the retained ducts.

SUMMARY OF THE INVENTION

According to the invention a bracket for holding a rigid duct includes a mounting part for attachment to a vehicle body part and a duct retaining part connected thereto. The duct retaining part includes a duct receptacle for at least partially surrounding a duct and having spaced inwardly extending clamping projections for providing compressive elastic contact with the duct.

This elastic contact between the receptacle and the duct, which is preferably limited to the clamping projections and by means of which the duct is secured in the receptacle, facilitates the greatest possible decoupling of the retaining parts from the dynamic and acoustic loads placed on the retained duct by the engine and/or the flowing refrigerant, so that the motions of the duct and the noise are not transmitted to the vehicle body.

Preferably, the duct retaining part is designed as a single piece and is made of an elastic material with a low temperature coefficient. In this way, the retention of the duct is also independent of temperature loading and temperature variations that arise during operation of the air conditioning system as a result of the flowing refrigerant and the duct cooled thereby, and also as a result of the engine heat. A well-suited material is the elastic engineering material known as HYTREL, a polyester elastomer made by the DuPont company.

The clamping projections can be axial ribs that can influence the degree of decoupling as a result of their characteristics, e.g. length, thickness, number and material, but especially their number. It has been demonstrated that adequate decoupling can be ensured by coaxial ribs arranged at intervals of 45° in the interior of the duct receptacle.

The receptacle can be divided into two portions along its axis and the two portions can be designed such that they are joined together by means of a hinge arranged to pivot parallel to the duct axis so that the duct can be embedded in one part and elastically pressed against the clamping projections by the other part, which pivots parallel to the duct axis onto the duct, thus elastically clamping the duct in the receptacle. To this end, it is possible to provide on both parts latching elements that attach the parts to one another against the clamping resistance.

This embodiment represents a rapid-action coupling with the damping properties in accordance with the object, by means of which assembly time can be reduced.

However, the receptacle can also be designed in the form of an opening having two legs with an open gap between them on the side where the duct is inserted. The duct can, in a simple manner, be pressed through the gap into the receptacle against the clamping force and be retained therein by elastic compression. This embodiment also represents a rapid-action coupling with the damping properties in accordance with the object of the invention. The free ends of the legs can be inwardly tapered to facilitate the pressing-in. This embodiment—like the aforementioned embodiment—simplifies assembly and also disassembly of the retained duct.

The retaining member can advantageously be designed for attachment to the relevant vehicle body part with a mounting screw, wherein at least one recessed oblong hole is made or formed in the mounting part to facilitate compensation for manufacturing tolerances between the parts.

The retaining system for rigid ducts in accordance with the invention is composed of a mounting part and several retaining parts in accordance with the invention arranged thereupon so that they can retain a plurality of ducts, such as the pressurized refrigerant duct and the refrigerant suction duct of an air conditioning system, preferably in parallel orientation. The retaining system is preferably designed as a single piece, which considerably reduces manufacturing and assembly expense.

The retaining system can be designed such that it is able to accommodate a duct with first and second duct sections at an angle to each other. For the latter, it has at least two retaining parts, one of which is provided to engage the angled section of the duct. In order to compensate for manufacturing tolerances, and thus avoid stresses in the retaining system, the retaining member provided for the angled section of the duct is preferably arranged so as to be movable, perpendicular to the axis of its duct receptacle, in the plane defined by the first and second duct sections. A slide rail may be provided on the mounting part perpendicular to the axis of the duct receptacle.

This retaining system is preferably made of a plastic with a low temperature coefficient, more particularly the elastic engineering material HYTREL from the DuPont company, so that the object according to the invention of decoupling the vehicle from the dynamic and acoustic loads is ensured for each of the retained ducts. The system can be designed in one piece with the exception of the previously described moveable duct retaining member.

The low temperature coefficient of the aforementioned material ensures that the dynamic and acoustic decoupling occurs even at very different duct and engine compartment temperatures.

The retaining system represents a compact mount for a plurality of ducts, which simplifies installation and disassembly of the ducts. A one-piece design, in particular, is associated with reduced cost and weight while also contributing to assembly process reliability.

The invention is explained below with the aid of exemplary embodiments.

DETAILED DESCRIPTION OF THE INVENTION

Figure 1:
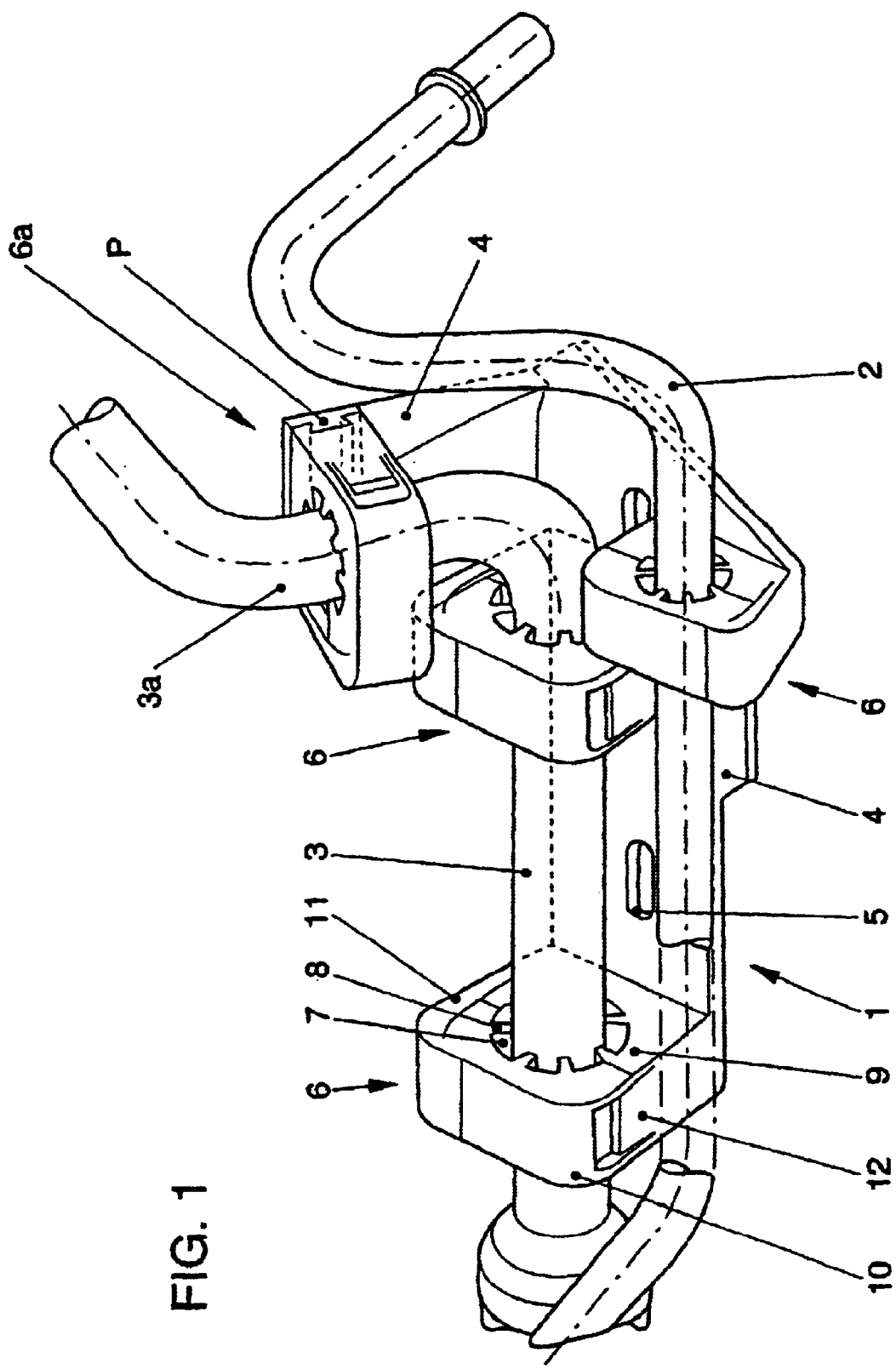
FIG. 1 is a perspective view of a retaining system in accordance with an embodiment of the invention for two rigid ducts.

FIG. 1 shows a duct retaining system 1 made of HYTREL, an elastic engineering material with a low temperature coefficient for two refrigerant ducts 2 and 3 of an air conditioner (not shown) in a passenger car. The pressurized refrigerant duct 2 is located between the condenser of the air conditioner and an expansion valve, and the refrigerant suction duct 3 is located between the expansion valve and the compressor of the air conditioner. Duct 2 is parallel to a first duct section 3 in the vicinity of the retaining system 1. The refrigerant suction duct 3 also has an angled second duct section 3a in the vicinity of the retaining system. The retaining system 1 is intended to be placed on a cover panel formed between longitudinal members, and has a mounting part 4 with two oblong holes 5 for screw-mounting to the cover panel, and also has several duct retaining parts 6 and one retaining part 6a, likewise made of HYTREL.

Duct retaining parts 6 are integrally joined to the mounting part 4 and the retaining part 6a is joined to the mounting part 4 by means of a dovetail slide P. Each retaining part has a duct receptacle 7 for the relevant duct 2 or 3. By means of the dovetail slide P retaining part 6a is arranged to be movable on the mounting part 4 perpendicular to the axis A of its receptacle 7 (FIGS. 2a, 2b) and parallel to the duct section 3, in the plane defined by the first duct section 3 and second duct section 3a. Arranged within duct receptacle 7 are clamping ribs 8 that face radially inward and are spaced apart from one another, preferably at angular spacing of 45° or less. When duct receptacle 7 is closed, the ribs 8 are elastically pressed against the relevant duct 1 or 3, holding it centered in the receptacle 7. The duct receptacles 7 are selected according to the diameter of the duct 2 or 3 that they are to hold.

Figures 2A, 2B:
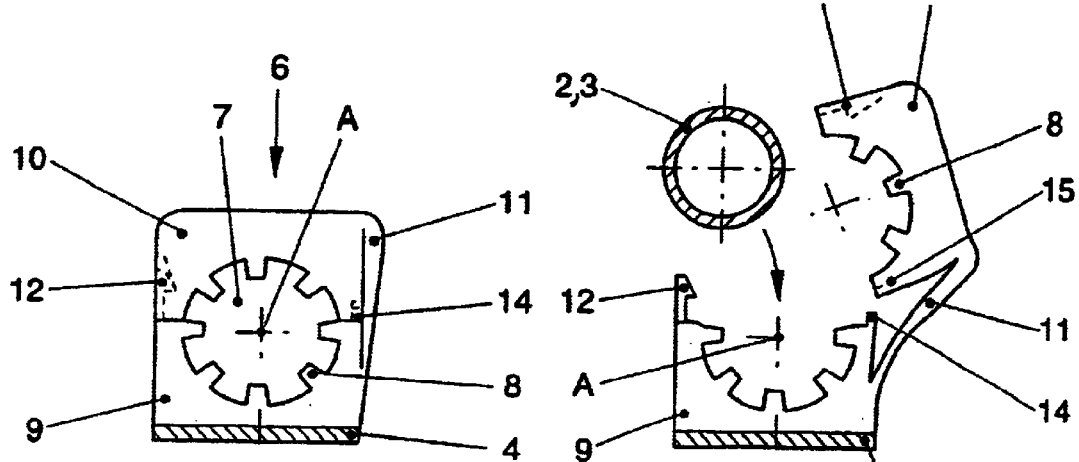
FIG. 2a is an axial view of a duct retaining part in the closed state.
FIG. 2b is an axial view of the duct retaining part of FIG. 2a in the open state.

In the vicinity of duct receptacle 7, the duct retaining members 6 and 6a are divided in two along their axis, and the two portions 9 and 10 are joined to each other by an integral hinge 11, as shown in FIGS. 2a and 2b. Formed onto the portion 9, on the side of the duct receptacle 7 opposite the integral hinge 11, is a latch projection 12 that mates with a corresponding latch recess 13 (shown in dashed lines in FIGS. 2a and 2b). The latch elements 12 and 13 secure the two portions 9 and 10 to one another, and in the process also absorb the clamping forces that arise.

FIGS. 2a and 2b show a duct retaining bracket 6 (6a is similar) in the closed and open states. It can be seen that the portions 9 and 10 each have, in addition to the latch elements 12 and 13, a locking element consisting of a hook 14 and hole 15 are provided on the integral hinge side in order to ensure additional lateral locking of the two parts 9 and 10.

Installation of a duct 2 or 3 is done in a simple manner by pressing it into the portion 9 of each retaining member 6 and 6a (FIG. 2b) provided for the particular duct 2 or 3 and subsequently pivoting the other portion 10 over the duct 2 or 3 and applying pressure until the latch elements 12 and 13 snap into place. The clamping ribs 8 and the regions on the portions 9 and 10 on which the clamping ribs 8 are formed are elastically compressed in this process so that the retained duct 2 or 3 is secured in the relevant retaining part 6 and 6a of the retaining system 1 while remaining dynamically and acoustically decoupled to a large extent. Disassembly is accomplished in the same simple manner by releasing the latched connection 12, 13 and removing the duct 2 or 3.

Figure 3:
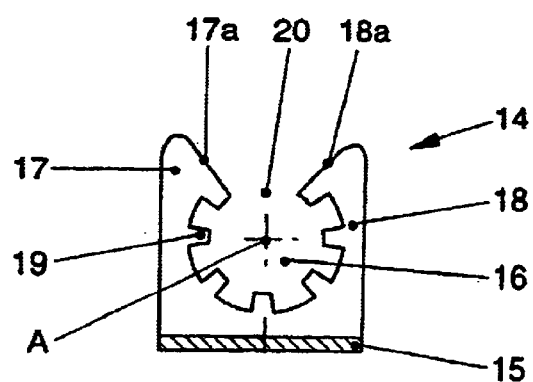
FIG. 3 is another embodiment of a duct retaining part.

FIG. 3 shows an alternate duct bracket 14, likewise made of HYTREL, that is made as a single piece including a mounting part 15. The retaining part has two legs 17 and 18 that have clamping ribs 19 and form a duct receptacle 16. Legs 17 and 18 are separated by an open gap 20 for insertion of a duct 2 or 3. Inward tapers 17a and 18a are formed at the free ends of the legs 17 and 18. The relevant duct 2 or 3 is pressed between the legs 17 and 18 in simple manner until it is clamped in place between the clamping ribs 19.

While there has been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

I claim:

1. A bracket for holding a rigid duct in a vehicle comprising a mounting part and a duct retaining part connected thereto, said duct retaining part comprising a duct receptacle for completely surrounding a retained duct and having radially inwardly extending clamping projections at substantially equal distances from each other for providing compressive elastic contact with said duct, wherein said duct retaining part comprises first and second portions arranged to extend along an axis of a retained duct, said portions being joined by an integral hinge portion arranged to pivot parallel to said axis.

2. A bracket as specified in claim 1, wherein said duct retaining part is formed of a single piece of elastic material with low temperature coefficient.

3. A bracket as specified in claim 2, wherein said material is a polyester elastomer.

4. A bracket as specified in claim 1, wherein said clamping projections comprise axially extending ribs.

5. A bracket as specified in claim 1, wherein said first and second portions further include latch elements for securing said portions together in clamped engagement with said retained duct.

6. A bracket as specified in claim 1, wherein said mounting part is arranged for attachment to the body of a vehicle by a screw connection.

7. A system for retaining rigid ducts in a vehicle comprising a mounting part and a plurality of duct retaining parts connected thereto, each of said duct retaining parts comprising a duct receptacle for at least partially surrounding a duct and having spaced, radially inwardly extending clamping projections for providing compressive elastic contact with said duct, wherein at least one of said duct retaining parts comprises first and second portions extending along an axis of a retained duct, said portions being joined by an integral hinge portion arranged to pivot parallel to said axis.

8. A system as specified in claim 7, wherein said first and second portions further include latch elements for securing said portions together in clamped engagement with a retained duct.

9. A system as specified in claim 7, wherein at least one duct retaining part comprises first and second legs having an open gap therebetween for insertion of a duct.

10. A system as specified in claim 7, wherein said system is formed as a single piece.

11. A system as specified in claim 7, wherein said system comprises an elastic material with a low temperature coefficient.

12. A system as specified in claim 11, wherein said material comprises a polyester elastomer.

13. A system as specified in claim 7, wherein said mounting part is arranged for attachment to the body of a vehicle by a screw connection.

14. A system for retaining rigid ducts in a vehicle comprising a mounting part and a plurality of duct retaining parts connected thereto, each of said duct retaining parts comprising a duct receptacle for at least partially surrounding a duct and having spaced, radially inwardly extending clamping projections for providing compressive elastic contact with said duct; the system for retaining a duct having a first duct section and a second duct section arranged at an angle to said first duct section and having one of said duct retaining parts arranged to retain said second duct section, said second duct section retaining part being arranged for sliding movement with respect to said mounting part, said sliding movement being in a direction which is perpendicular to an axis of said second duct section and parallel to a plane defined by said first and second duct sections.

15. A system as specified in claim 14, wherein said second duct section retaining part is connected to said mounting part by a slide rail for providing said sliding movement.

16. A bracket for holding a rigid duct in a vehicle comprising a mounting part and a duct retaining part connected thereto, said duct retaining part comprising a duct receptacle at least partially surrounding a retained duct and including first and second legs attached to a base and arranged to be on opposite sides of a retained duct, said legs having an open gap between said legs for insertion of a duct, said legs and said base having equally spaced radially inwardly extending clamping projections at substantially equal distances from each other, said legs having inwardly tapered portions on opposite side of said open gap.

* * * * *